1,675,107

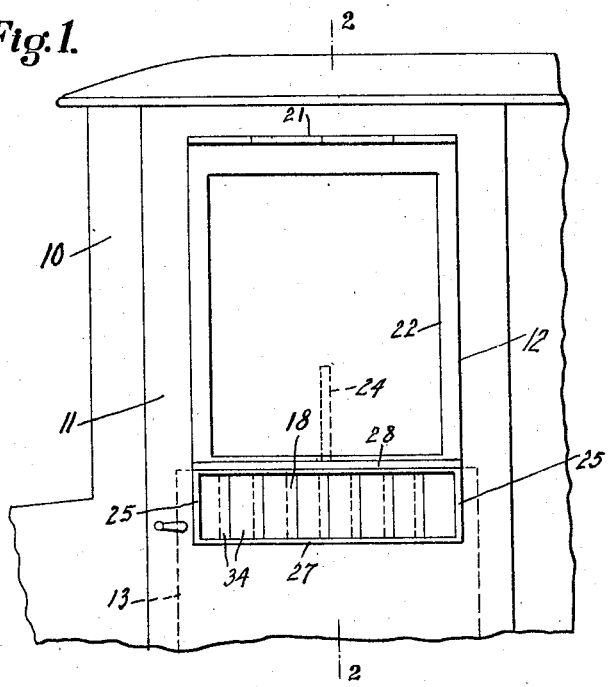
June 26, 1928.
H. KAPLAN
1,675,107
AUXILIARY WINDOW FOR CLOSED TYPES OF MOTOR VEHICLES
Filed Aug. 20, 1927
INVENTOR
H. Kaplan
BY
ATTORNEY Patented June 26, 1928.

UNITED STATES PATENT OFFICE.

HYMAN KAPLAN, OF NEW YORK, N. Y.

AUXILIARY WINDOW FOR CLOSED TYPES OF MOTOR VEHICLES.

Application filed August 20, 1927. Serial No. 214,311.

The present invention relates to improvements in closed types of motor vehicles, and more particularly to an auxiliary window therefor.

The doors of closed type of motor vehicles, such as coupés, sedans, limousines or the like, are usually each provided with an opening which serves as a window. This opening is usually closed by a window pane, which is adapted to slide downwardly into a pocket formed in the lower portion of the door. The window pane in the door on the left side of the driver's seat is usually kept in its open position, so as to permit the driver to signal with his hand to following vehicles the direction in which he intends to turn or the fact that he may slow down or stop the vehicle altogether. In rainy or cold weather it is desirable to slide the window pane to its upper, closing position, but this is almost impossible because it interferes with the driver's signaling operations. It is for this reason that, even in rainy or cold weather, the said window pane is always kept in its lower position.

The main purpose of the present invention is to provide an auxiliary window for motor vehicles, which is adapted to be kept in its closed position and yet will not interfere with giving signals to the vehicles following the vehicle to which the said auxiliary window is applied.

Another object of the invention is to provide a device of the character specified, which is simple in construction, durable in use and which may be readily mounted on closed vehicles of all types.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1 is a side elevation of the front portion of a motor vehicle having a closed body and showing the improved auxiliary window applied to that front door thereof which is to the left of the driver's seat; Fig. 2 is a section taken on line 2—2 of Fig. 1; Fig. 3 is a similar section taken through the lower portion of the auxiliary window, on a larger scale; and Fig. 4 is a similar section taken through the upper portion of the auxiliary window, on a larger scale.

In the drawings, the numeral 10 indicates the front portion of the closed body of a motor vehicle, and 11 that front door which is to the left of the driver's seat. This door is provided in its upper portion with an opening 12, which serves as a window. With this opening co-operates a window pane 13, which is adapted to slide downwardly into a pocket 14, formed in the lower portion of the door. When the window pane is in its lowermost position, it is wholly disposed below the window opening.

Into the window opening is adapted to be fitted on auxiliary window, when the window pane 13 is in its lowermost position. This auxiliary window comprises a frame 15, fitting snugly into the window opening and held therein in a manner hereinafter to be described. The frame comprises two stiles 16, connected by an upper rail 17 and by a lower rail 18. The lower rail is made in the form of a casing of a construction and for a purpose hereinafter to be specified. The casing-like structure 18 rests upon the lower horizontal edge of the window opening, extending throughout the width of the window opening, as clearly shown in Fig. 1 of the drawings. The frame now described may be held within the window opening in any suitable manner. In the case illustrated it is provided with fixed clips 19, adapted to bear against the inner face of the door 11 and held in such positions by screw-bolts 20, extending through the said clips into the frame of the door 11.

To the rail 17 is hinged at 21 a window sash 22, provided with a window pane 23. This window sash is adapted to be swung outwards into the position shown in dotted lines in Fig. 2 of the drawings and may be held in such position by one or more braces 24, which are adapted to fold against the window pane 23 when the latter is in its closing position, shown in full lines in Fig. 2 of the drawings. When in the position shown in dotted lines in Fig. 2 of the drawings, it allows of ventilation of the interior of the closed body of the motor vehicle. The sash 22 may be held in its closing position by any suitable means, not shown.

The casing-like structure 18 comprises ends 25, connected by a top 26 and a bottom 27. The bottom rests upon the lower horizontal edge of the window opening 12, and the lower horizontal edge of the pane 23 bears against the top 26 of the casing-like structure when the sash 22 is in the closing position shown in full lines in Fig. 2 of the drawings. The outer portion 28 of the top 26 slants downwards, so that it will shed rain. In the bottom 27 of the casing-like structure is provided a slot 29, extending throughout the length of the same and being in alignment with vertical slots 30 in the ends 25 of the casing-like structure. These slots are so arranged that they permit the window pane 13 to be raised until its upper horizontal edge abuts against the inner face of the top 26 of said casing-like structure. The sides of the casing-like structure are missing, so that when the window pane 13 is in its lowermost position, in which its upper edge is below the bottom 27 of the casing-like structure, the driver of the car may thrust his hand through the casing-like structure for the purpose of giving signals to the following vehicles or to pedestrians.

Within the casing-like structure 18 is disposed a plurality of curtains 31, each curtain consisting of two layers of sheet material, said layers being designated by the numerals 32 and 33. Each layer consists of a plurality of strips 34, arranged side by side and attached at their upper ends to a rail 35, which is fixed to the inner face of the top 26 of the casing-like structure. The lower edges of the said strips bear against a rail 36, which is fixed to the inner face of the bottom 27 of the casing-like structure, and the said lower ends are weighted, as shown at 37, so as to keep them always against the rail 36. The strips of the layer 32 overlap the strips of the layer 33, so as to shut out the cold or rain when the window pane 13 is in its lowermost position. The curtains may be made of any suitable fabric, preferably rubber or rubberized fabric, to withstand exposure to rain and snow.

The operation of this device is as follows: When the auxiliary window is mounted upon the vehicle door, the curtains 31 shut out the cold and rain, the sash 22 being normally held in its closing position, shown in full lines in Fig. 2 of the drawings. When the car is rolling along in open country, where there is not much signaling to be done, the window pane 13 may be raised into the position shown in Figs. 2 and 3 of the drawings, in which its upper horizontal edge bears against the inner face of the top 26 of the casing-like structure 18. In traffic, however, the window pane 13 is lowered, thereby permitting the driver to thrust his hand through the curtains 31 for signal purposes. When the driver withdraws his hand from the casing-like structure 18, the strip elements of the curtains drop back to closing positions, shown in Figs. 1, 2 and 3 of the drawings.

What I claim is:—

1. The combination with a motor vehicle door having a window opening, of a pane slidable in said door and adapted to close said opening, a frame adapted to be fitted into said window opening when said pane is in its lowermost position, said frame including a casing-like structure having open sides, and a plurality of curtains in said casing-like structure closing the latter, each curtain being made of a plurality of sections to permit a hand to be thrust through the open sides of said casing-like structure, and means upon said curtain sections for causing the latter to drop to closing positions as the hand is being withdrawn from said casing-like structure, said casing-like structure comprising two ends connected by a top and a bottom, said bottom resting upon the upper edge of said window opening and being provided with a slot extending throughout its width in alignment with vertical slots in said ends, all of said slots being in alignment with said pane and of a size to permit the latter to be raised to bring its upper horizontal edge into abutment with the inner face of said top, thereby closing said casing-like structure.

2. The combination with a motor vehicle door having a window opening, of a pane slidable in said door and adapted to close said opening, a frame adapted to be fitted into said window opening when said pane is in its lowermost position, said frame including a casing-like structure having open sides, a plurality of curtains in said casing-like structure closing the latter, each curtain being made of a plurality of sections to permit a hand to be thrust through the open sides of said casing-like structure, means upon said curtain sections for causing the latter to drop to closing positions as the hand is being withdrawn from said casing-like structure, and a window pane hinged to said frame and disposed above said casing-like structure.

Signed at New York, in the county of New York, and State of New York, this 15th day of July, A. D. 1927.

HYMAN KAPLAN.